(12) United States Patent
Perkins et al.

(10) Patent No.: US 8,219,826 B2
(45) Date of Patent: Jul. 10, 2012

(54) SECURE PIN CHARACTER RETRIEVAL AND SETTING

(75) Inventors: George S. Perkins, Columbus, GA (US); Richard E. Sway, Columbus, GA (US); Gary W. Hellman, Phenix City, AL (US)

(73) Assignee: Total System Services, Inc., Columbus, GA (US)

( * ) Notice: Subject to any disclaimer, the term of this patent is extended or adjusted under 35 U.S.C. 154(b) by 163 days.

(21) Appl. No.: 12/553,747

(22) Filed: Sep. 3, 2009

(65) Prior Publication Data

US 2010/0058068 A1    Mar. 4, 2010

Related U.S. Application Data

(60) Provisional application No. 61/190,933, filed on Sep. 4, 2008.

(51) Int. Cl.
*G06F 21/00* (2006.01)
(52) U.S. Cl. .......................................... 713/184; 726/6
(58) Field of Classification Search .......... 713/182–184; 705/67; 726/4–5
See application file for complete search history.

(56) References Cited

U.S. PATENT DOCUMENTS

| | | | |
|---|---|---|---|
| 6,070,154 A | 5/2000 | Tavor et al. | |
| 7,350,695 B2* | 4/2008 | Piccirillo et al. | 235/375 |
| 7,386,731 B2* | 6/2008 | Sanai et al. | 713/183 |
| 7,526,652 B2* | 4/2009 | Ziegler | 713/184 |
| 2002/0123972 A1 | 9/2002 | Hodgson et al. | |
| 2005/0166061 A1* | 7/2005 | Brookner et al. | 713/184 |
| 2005/0229003 A1* | 10/2005 | Paschini et al. | 713/184 |
| 2005/0289652 A1* | 12/2005 | Sharma et al. | 726/26 |
| 2007/0282756 A1 | 12/2007 | Dravenstott et al. | |
| 2008/0005039 A1 | 1/2008 | Puthupparambil et al. | |
| 2008/0147564 A1 | 6/2008 | Singhal | |
| 2008/0189214 A1 | 8/2008 | Mueller et al. | |

OTHER PUBLICATIONS

International Search Report, PCT/US2009/055912, Oct. 26, 2009, pp. 1-2.

* cited by examiner

*Primary Examiner* — Nathan Flynn
*Assistant Examiner* — Phuoc Tran
(74) *Attorney, Agent, or Firm* — King & Spalding

(57) ABSTRACT

Disclosing a secure personal identification number ("PIN") associated with a financial account to an account holder. A PIN reveal application can interact with a hardware security module ("HSM") to decrypt and disclose the PIN to the account holder one or more PIN character(s) at a time. The account holder also can set a new PIN in a secure manner. A PIN set application can interact with the HSM to encrypt PIN characters received by the PIN set application from the account holder. The HSM provides a secure platform to encrypt and decrypt the secure PIN.

21 Claims, 5 Drawing Sheets

SECURE PIN CHARACTER RETRIEVAL AND SETTING

RELATED PATENT APPLICATION

This non-provisional patent application claims priority under 35 U.S.C. §119 to U.S. Provisional Patent Application No. 61/190,933, entitled, "Method And System For Secure PIN Digit Retrieval," filed Sep. 4, 2008, the complete disclosure of which is hereby fully incorporated herein by reference.

TECHNICAL FIELD

The invention relates generally to payment card security, and more particularly to methods and systems for disclosing a personal identification number ("PIN") associated with a financial account to an account holder and for allowing the account holder to set or modify the PIN.

BACKGROUND

With the explosion of electronic commerce and digital personal information, facilitated by the rapid growth of the Internet, focus has been placed on the protection of financial and personal data. One element in protecting these data is encryption. Encryption is the process of converting information into an unintelligible form except to holders of a specific cryptographic key. By encrypting the information, it is protected against unauthorized disclosure.

Encryption is accomplished through a cryptographic algorithm. The algorithm is used to "lock" the information at one point and "unlock" it at another. Keys are used to lock and unlock the information. In a secret-key or symmetric key encryption, the same key is used to lock and unlock (encrypt and decrypt) the information. In public key or asymmetric key encryption, a public key is used to encrypt the information and a private key is used to decrypt the information. A key is often a numerical value. The length of the key generally determines the relative security of the key.

Many types of information use encryption. One example is the payment card industry, including credit card data and other financial information. Indeed, the credit card industry had taken great steps to ensure that financial data and transaction data is protected. For example, cardholder data must be encrypted when it is stored or transmitted over a public network. This requirement covers everything from producing the credit cards, including information stored on the magnetic strip or embedded chip on the card, to authenticating and authorizing transactions made with the card. One key piece of data that must be encrypted is a user's personal identification number (PIN).

Financial institutions employ Internet web sites to support customer transactions and account access. A customer can log into the web site and select links to navigate to web pages having content associated with the account. The customer can also complete certain transactions, such as transfers between multiple accounts and bill payments.

Financial institutions also employ interactive voice response (IVR) applications to support customer transactions. Typically, a customer will call a telephone number for the system. An automated system will provide recorded instructions to the user, such as, "for inquiries about a checking account, press 1." The customer uses the number key pad on a telephone to select menu items and enter alphanumeric data, such as an account number.

However, one option that is not available to customers using an Internet web site or an IVR application is for the customer to access a PIN or password associated with an account while providing a secure platform for the information. Current standards and best practices require that a PIN remain encrypted at all times, excepting when the PIN is in a hardware security module ("HSM") or in a PIN mailer that is mailed to the customer when the customer opens an account or requests a new PIN. If a customer forgets a PIN associated with a financial card, such as a credit or debit card, the conventional solution is to generate a new PIN and mail the new PIN to the customer in a PIN mailer. This process is expensive and leaves the card unusable until the new PIN is received by the customer. With the advent of computers and online banking, such delay is unacceptable and frustrating to the customer. This process also leads to confusion as customers frequently forget that a new PIN has been issued and continue to attempt to use the old PIN, leading to even further administrative expense.

Accordingly, systems and methods are needed to provide customers with quick and secure access to a PIN associated with a financial account. Another need exists for systems and methods for allowing an account holder to quickly set or modify the PIN.

SUMMARY

The present invention provides systems and methods for disclosing a personal identification number ("PIN") associated with a financial account to an account holder and for allowing the account holder to set or modify the PIN. A PIN reveal application can interact with a hardware security module ("HSM") to decrypt and disclose the PIN to the account holder one or more PIN character(s) at a time. A PIN set application can interact with the HSM to encrypt PIN characters received by the PIN set application from the account holder. The HSM can include a combination of hardware and software that provides a secure platform to encrypt and decrypt a PIN. An account holder can use a web browser interface or an interactive voice response ("IVR") interface to retrieve or set a PIN in a secure manner.

One aspect of the present invention provides a method for disclosing a PIN associated with an account. The method includes the steps of: (a) receiving a request to disclose a PIN, the PIN including PIN characters stored in an encrypted form; (b) requesting with a PIN application executing on a computer a decrypted form of one of the PIN characters from an HSM; (c) receiving, at the PIN application, the decrypted form of the one PIN character; (d) outputting the decrypted form of the one PIN character, and (e) repeating steps (b) through (d) for each PIN character, wherein a previously requested PIN character is deleted from the PIN application prior to requesting another PIN character.

Another aspect of the invention provides a system for disclosing a PIN associated with a transaction account. A user interface can process a request for disclosure of a portion of the PIN in an unencrypted form, the PIN including PIN characters stored in an encrypted data element. A PIN module, logically coupled to the user interface and to an HSM, is operable to decrypt the encrypted data element. The PIN module can receive the request for disclosure from the user interface and interact with the HSM to decrypt the portion of the PIN and provide the decrypted portion for presentation via the user interface.

Another aspect of the present invention provides a method for setting a PIN of an account. The method includes the steps of (a) providing a user interface for a user to enter characters for including in the PIN; (b) receiving the characters entered at the user interface at a PIN application; (c) storing the received characters on a secure platform; (d) encrypting the received characters into an encrypted PIN data element comprising the PIN; and (e) transmitting the encrypted PIN data element to a card processing system. Each PIN character can be received by the user interface separately. The characters received at the user interface can be deleted prior to receiving any additional characters at the user interface.

These and other aspects, objects, features, and embodiments of the invention will become apparent to a person of ordinary skill in the art upon consideration of the following detailed description of illustrative embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description, in conjunction with the accompanying figures briefly described as follows.

DETAILED DESCRIPTION OF EXEMPLARY EMBODIMENTS

Exemplary embodiments of the present invention are provided. These embodiments include systems and methods for disclosing a secure personal identification number ("PIN") associated with a financial account to an account holder and for allowing the account holder to set or modify the PIN. A PIN reveal application can interact with a hardware security module ("HSM") to decrypt and disclose the PIN to the account holder one or more PIN character(s) at a time. A PIN set application can interact with the HSM to encrypt PIN characters received by the PIN set application from the account holder. The HSM can include a combination of hardware and software that provides a secure platform to encrypt and decrypt a PIN. The HSM may also provide validation for a received PIN. An account holder can use a web browser interface or an interactive voice response ("IVR") interface to retrieve or set a PIN in a secure manner.

The invention can include one or more computer programs that embody the functions described herein and illustrated in the appended flow charts. However, it should be apparent that there could be many different ways of implementing aspects of the invention in computer programming, and these aspects of the invention should not be construed as limited to any one set of computer instructions. Further, a skilled programmer would be able to write such computer programs to implement an embodiment of the disclosed invention based on the flow charts and associated description in the application text. Therefore, disclosure of a particular set of program code instructions is not considered necessary for an adequate understanding of how to make and use the invention. The inventive functionality of the claimed invention will be explained in more detail in the following description read in conjunction with the figures illustrating the program flow. Further, those skilled in the art will appreciate that one or more stages described may be performed by hardware, software, or a combination thereof, as may be embodied in one or more computing systems.

Figure 1:
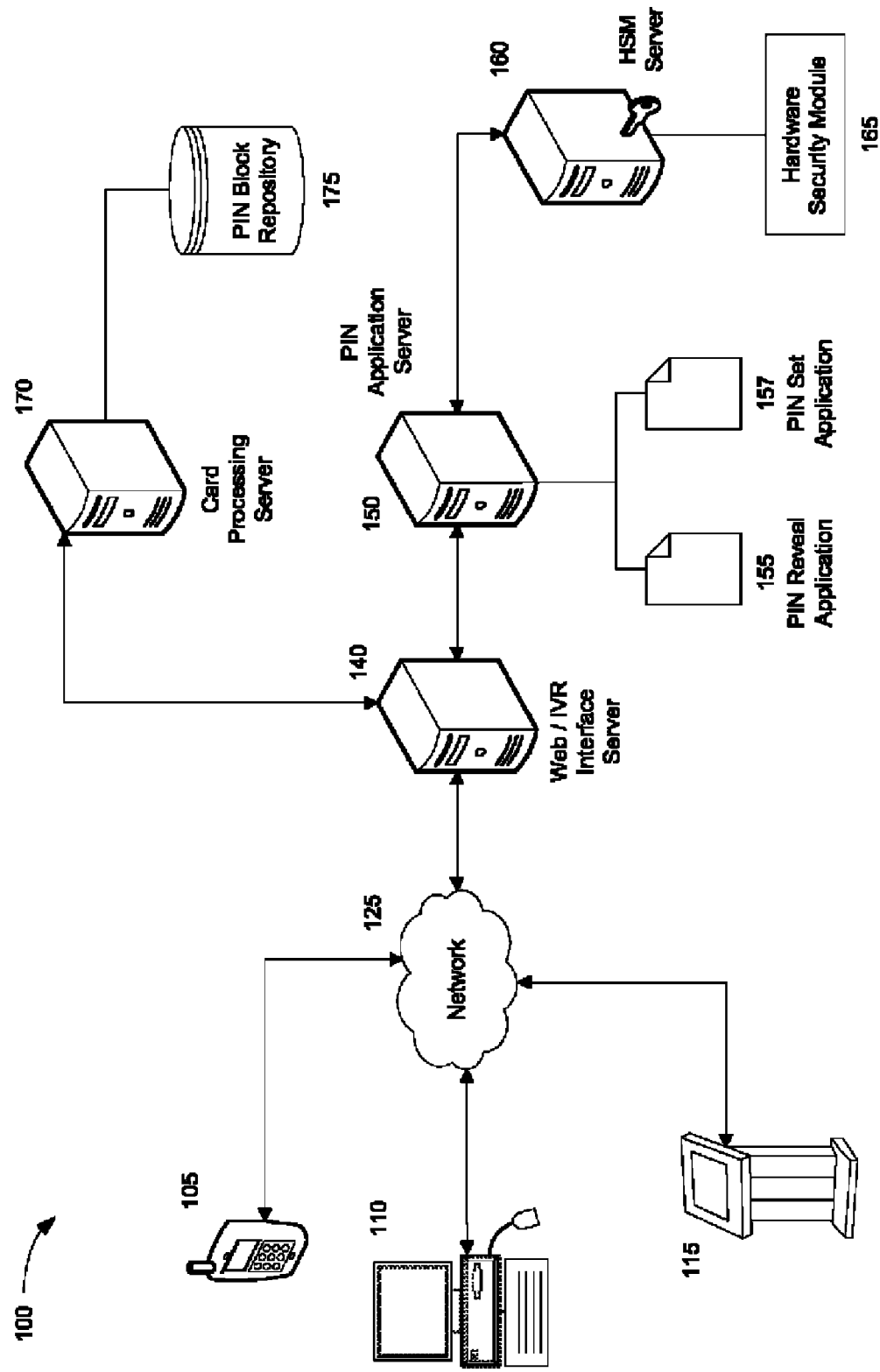
FIG. 1 is a block diagram depicting a system architecture in accordance with certain exemplary embodiments.

Turning now to the drawings, in which like numerals indicate like elements throughout the figures, aspects of the exemplary embodiments are described in detail. FIG. 1 is a block diagram depicting a system architecture 100 in accordance with certain exemplary embodiments. Referring to FIG. 1, the system architecture 100 includes a PIN application server 150 having a PIN reveal application 155 and a PIN set application 157. The PIN applications 155 and 157 are typically implemented by software modules that reside in a computer-readable memory storage device of a programmed computing device (e.g., PIN application server 150) and can be executed by a processor via computer readable memory. The PIN applications 155 and 157 can comprise application programming interfaces ("APIs") that interact with a user, such as an account holder, via a user interface provided by a Web/IVR interface server 140. The user interface can be provided by the Web/IVR interface server 140 to a user device, such as mobile phone 105, computer 110, or kiosk 115. The PIN applications 155 and 157 can also interact with one or more HSMs, such as HSM 165 that the PIN application server 150 is connected to.

The HSM 165 is typically implemented as a combination of hardware and software modules embodied in a HSM server 160 having a computer readable storage medium for storing the software modules and a processor for executing the software modules. In certain exemplary embodiments, the HSM 165 may be embodied as software alone. The HSM 165 provides a secure platform to generate, store, and protect cryptographic keys. The HSM 165 component provides a secure platform to encrypt and decrypt account holder information, such as a PIN. The HSM 165 can include software code or hardware modules that allow the HSM to interact with the PIN reveal application 155 and the PIN set application 157.

The PIN reveal application 155 securely provides an account holder with a PIN associated with an account of the account holder. Current standards and best practices require that PINs associated with financial accounts are stored at a payment processor, such as card processing server 170, in an encrypted form. Typically, these PINs are stored in encrypted PIN blocks that can also include other account related information. The PINs, in their entirety, must remain encrypted at all times, excepting when the PIN is stored in an HSM 165 or in a PIN mailer that is mailed to the account holder. The PIN reveal application 155 provides a means for disclosing a PIN to an account holder by storing only a portion (typically, one PIN character) of the PIN in a decrypted format at a given time and disclosing only that portion to the account holder. The portion of PIN characters disclosed at a given time can include any number of PIN characters less than the entirety of the PIN to remain compliant. In certain exemplary embodiments, the PIN reveal application 155 operates to reveal the entire PIN, one PIN character at a time. In certain exemplary embodiments, the PIN reveal application 155 operates to reveal only a portion of the entire PIN, one character at a time. For example, the PIN reveal application 155 may operate as a "memory jogger" by only revealing up to the first two or three characters of the PIN, one character at a time. Although conventional financial account PINs typically include four numerical PIN characters, the PIN reveal application 155 can be adapted to reveal PINs having any number of characters or symbols and is not limited to just numerical characters. The PIN reveal application 155 is described in more detail below with reference to FIG. 2.

The PIN set application 157 allows an account holder to set or modify a PIN associated with an account. The PIN set application 157 can interact with the user via a user interface provided by the Web/IVR interface server 140 to receive a PIN from the account holder one or more characters at a time. The PIN set application 157 can also interact with the HSM 165 to encrypt the PIN into an encrypted PIN block and send the encrypted PIN block to the card processing server 170 for storage in the PIN block repository 175. The PIN set application 157 is described in more detail below with reference to FIG. 3.

The Web/IVR interface server 140 is connected to a network 125, such as the Internet or a telephone network. The Web/IVR interface server 140 provides secure access between an account holder and a financial account, such as a bank account or credit card account. The Web/IVR interface server 140 can include a web server application (not shown) that provides a user interface to the account holder in the form of an Internet web site (not shown). The web site can be provided via the network 125 (e.g., the Internet) to a user device having a web browser, such as mobile phone 105, computer 110, kiosk 115, or any other device having a web browser. The web site can provide secure access using a secure cryptographic network communication protocol, such as transport layer security ("TLS") or secure sockets layer ("SSL") protocols or the like. The PIN reveal application 155 and the PIN set application 157 can interact with the web site to provide a PIN to or receive a PIN from the account holder in a secure manner.

Additionally, or alternatively, the Web/IVR interface server 140 can include an IVR application (not shown) that provides an automated user interface to the account holder via a telephone, such a mobile phone 105, or a conventional touch-tone telephone (not shown). The IVR application can solicit information (e.g., account number, password, etc.) and requests (e.g., available balance) from the account holder, typically by using a pre-recorded audio based menu. The IVR application can receive information and requests from the account holder in the form of speech or telephone touchtone keypad entries and decode this speech or tones representing the keypad entries. The IVR application can respond to requests using pre-recorded audio or a speech synthesizing application (not shown). In an IVR embodiment, the network 125 can comprise a cellular telephone network, a public-switched telephone network, the Internet (e.g., voice over Internet protocol) or any other telephone network. The PIN reveal application 155 and the PIN set application 157 can interact with the IVR application to provide a PIN to or receive a PIN from the account holder in a secure manner.

The Web/IVR server 140 is connected to the card processing server 170. The card processing server 170 supports financial transactions involving an account for an account holder. For example, the card processing server 170 may authorize transactions for an account, such as a debit card account linked to a specific bank account, a pre-paid debit card, a credit card, or a retail card. Part of this process may be to verify a PIN supplied by an account holder in connection with a transaction. These cards may have a specific PIN or other security feature.

The card processing server 170 can store information associated with financial accounts, such as account number, balance, transaction history, or any other account information that may be used to authorize transactions or that an account holder may request. As discussed above, the card processing server 170 can also store a PIN for the account in a PIN block repository 175. For security purposes, the PIN can be stored in an encrypted PIN block. Typically, the PIN block includes the PIN and at least a portion of the account number.

Although the Web/IVR interface server 140, the PIN application server 150, the HSM server 160, and the card processing server 170 are illustrated in FIG. 1 and described herein as being servers, one skilled in the art would appreciate that these servers could be embodied as various other types of computing devices, such as workstation and mainframe computers. Additionally, the connections between these servers may be implemented using a computer network, such as a local area network ("LAN") or a wide area network ("WAN").

Figure 2:
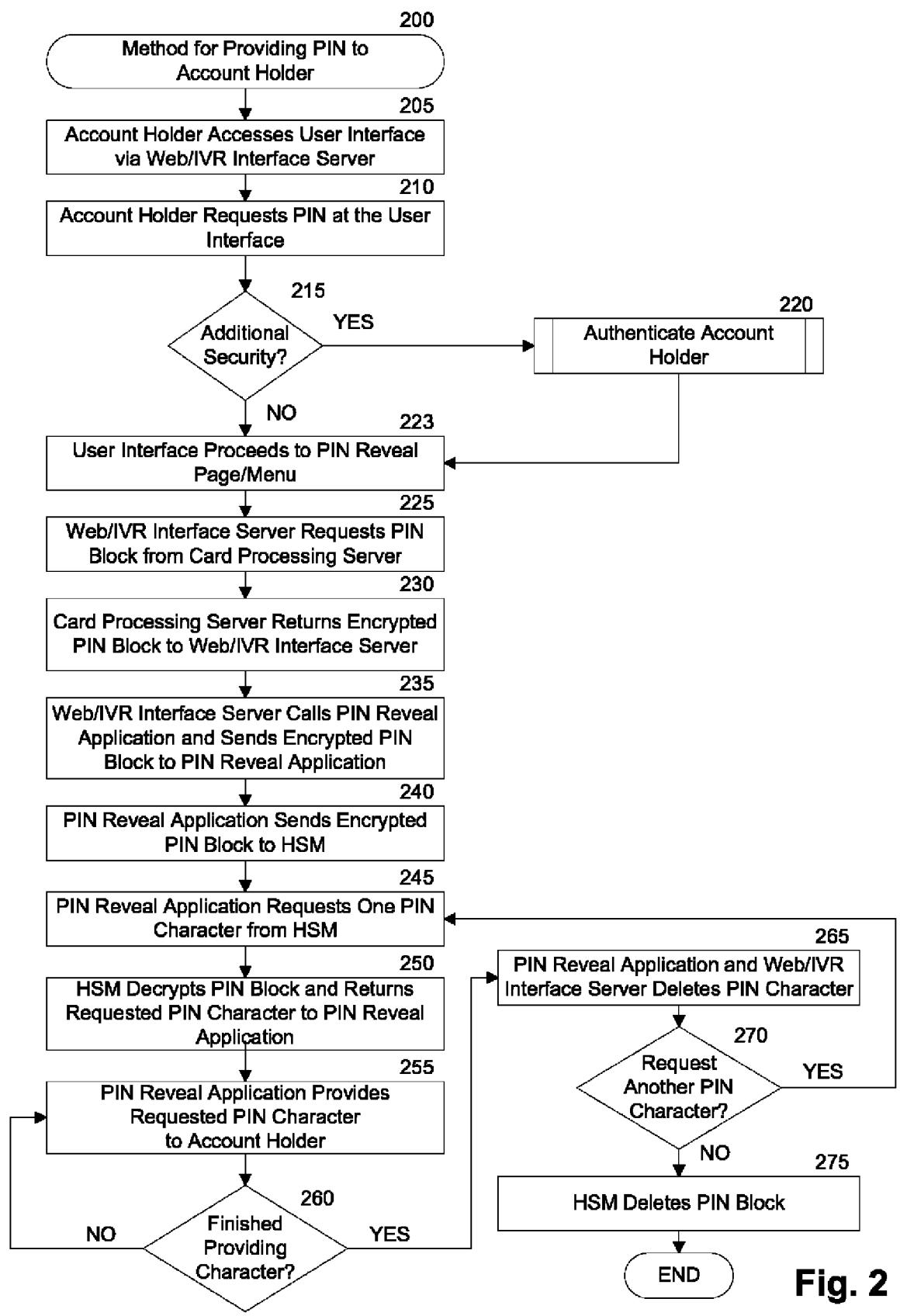
FIG. 2 is a process flow diagram depicting a method for providing an account holder with a personal identification number ("PIN") associated with an account in accordance with certain exemplary embodiments.

FIG. 2 is a process flow diagram depicting a method 200 for providing an account holder with a PIN associated with an account in accordance with certain exemplary embodiments. Referring to FIGS. 1 and 2, in step 205, the account holder accesses a user interface provided by a Web/IVR interface server 140. In an Internet web site embodiment, the account holder may navigate to an Internet web site hosted or otherwise provided by the Web/IVR interface server 140 using a web browser executing on a user device, such as computer 110. The web site may prompt the account holder to log into the web site using a user name and password or other information to authenticate the account holder. In an IVR embodiment, the account holder may call a telephone number associated with the Web/IVR interface server 140 using a telephone, such as mobile phone 105. An IVR application executing on the Web/IVR interface 140 can receive the call and provide a pre-recorded message prompting the account holder for account information for authentication. The Web/IVR interface server 140 can use information provided by the account holder to authenticate the account holder prior to providing account information at the user interface. Alternatively, the Web/IVR interface server 140 may provide the information to another computer or server, such as card processing server 170, to complete the authentication.

In step 210, the account holder makes a request at the user interface to view or hear a PIN associated with an account, such as a financial account. In an Internet web site embodiment, the account holder may use a pointing device to click on a link or tab displayed on a web page associated with the account. In an IVR embodiment, the account holder may press a key pad on the mobile phone 105 that corresponds with a "Request PIN" selection.

In step 215, the Web/IVR interface server 140 determines whether any additional security measures are required for the account holder to receive the PIN. This determination can be based on a status of the account holder or on the type of account that the PIN is associated with. Alternatively, all account holders and all account types may require additional security. If additional security is required, the method 200 proceeds to step 220. If no additional security is required, the method proceeds to step 223.

In step 220, the account holder is authenticated based on the additional security measures. The user interface may prompt the account holder for additional security information, such as a card verification value ("CVV") number printed on a card associated with the account. The Web/IVR interface server 140 may then compare information received from the account holder to account information stored at the Web/IVR interface server 140 to authenticate the account holder. Alternatively, the Web/IVR interface server 140 may send the information to a card processing server 170 for authentication. Step 220 is described in more detail below with reference to FIG. 4.

In step 223, the user interface proceeds to a secure Internet web page in an Internet embodiment or to a PIN reveal menu in an IVR embodiment. In an Internet embodiment, the web page for revealing a PIN to the account holder may include masked characters corresponding to characters of the PIN. The account holder can select the PIN characters to request that that PIN character be displayed on the web site. In an IVR embodiment, the PIN reveal menu may prompt the user to select which PIN character to reveal using a telephone keypad.

In step 225, the Web/IVR interface server 140 requests an encrypted PIN block for the account from a card processing server 170 that stores the PIN block. In certain exemplary embodiments, whereby the card processing server 170 authenticates the account holder, the Web/IVR interface server 140 may send a request for the encrypted PIN block with the additional security information obtained in step 220 to the card processing server 170. Thus, the Web/IVR interface server 140 does not have to send two separate requests to the card processing server 170 to obtain the PIN block.

In step 230, the card processing server 170 sends the PIN block to the Web/IVR interface server 140. In step 235, the Web/IVR interface server 140 makes a call to a PIN reveal application 155 at a PIN application server 150 and sends the PIN block to the PIN reveal application 155.

In step 240, the PIN reveal application 155 sends the PIN block to an HSM 165 at an HSM server 160 and the HSM 165 stores the PIN block in memory.

In step 245, the PIN reveal application 155 requests one character of the PIN from the HSM 165. In certain exemplary embodiments, the requested character may be based on an input received at the user interface from the account holder. For example, with reference to an exemplary screen image of a user interface 500 provided in FIG. 5, each PIN character 510A-510D may initially be masked using an asterisk or other symbol. The account holder can use a mouse or other pointing device to move a cursor 515 and select (e.g., click on or hover over) one of the masked characters to generate a request for that PIN character. In the screen image, the account holder has selected the first PIN character 510A having a value of 5. The other PIN characters 510B-510D remain masked.

In IVR embodiments, the account holder can request a PIN character by pressing a key on a telephone keypad corresponding to one of the PIN characters. For example, the IVR may prompt the account holder to select PIN character one by pressing a "1" key on the telephone keypad.

In certain embodiments, the PIN characters may not be selectable by the user. Instead, the PIN characters may be requested from the HSM 165 sequentially.

In step 250, the HSM 165 decrypts the PIN block and returns the one requested PIN character to the PIN reveal application 155. That is, the decryption takes place on a secure platform. In step 255, the PIN reveal application 155 provides the received PIN character to the Web/IVR interface server 140 and the user interface of the Web/IVR interface server 140 reveals the PIN character to the account holder. In an Internet embodiment, the PIN character may be displayed on a web page. In an IVR embodiment, the PIN character may be communicated to the account holder using a pre-recorded message.

In step 260, the Web/IVR interface server 140 determines whether to stop providing the PIN character to the account holder. Continuing the Internet example from step 245, if the account holder deselects the PIN character 510A, the web page can re-mask the PIN character 510A. The Web/IVR interface server 140 can also determine to stop providing the PIN character based on a time period. For example, the Web/IVR interface server 140 can stop providing the PIN character based on a period of inactivity. In an IVR embodiment, the PIN character may be verbalized a single time. If the Web/IVR interface server 140 determines to stop providing the PIN character, the method 200 proceeds to step 265. Otherwise, the method 200 returns to step 255 to continue providing the PIN character.

In step 265, the PIN reveal application 155 and the Web/IVR interface server 140 delete the previously displayed (or verbalized) PIN character. The PIN character can be deleted at both servers by overwriting memory used to temporarily store the PIN character with random data or by any other suitable means for clearing computer memory.

In step 270, the PIN reveal application 155 determines whether to request another PIN character from the HSM 165. For example, the account holder may request each PIN character, one at a time, until the entire PIN has been revealed via the user interface, one character at a time. Or, in the alternative, the PIN reveal application 155 may operate to request the remaining PIN characters in sequential fashion until each character is presented via the user interface, one character at a time. In another example, the PIN reveal application 155 may limit the account holder to retrieving a portion of the entire PIN only, such as the first two PIN characters, one character at a time. If another PIN character is requested, the method 200 returns to step 245. Otherwise, the method 200 proceeds to step 275.

In step 275, the HSM 165 deletes the PIN block from memory. Although this step is not necessary for security or compliance purposes, the HSM 165 can free the memory for other purposes. After step 275, the method 200 ends. Of course, the Web/IVR interface server 140 may continue to interact with the account holder as necessary to complete the account holder's service.

Although the method 200 for providing an account holder with a PIN has been described in terms of presenting an account holder with a PIN, one character at a time, the method 200 can be adapted to present more than one PIN character at a time. For example, conventional financial account PINs typically include four numerical characters. Based on current standards and best practices prohibiting the storage of a decrypted PIN in its entirety outside of an HSM 165 or a PIN mailer, the method 200 could be adapted to present one, two, or three of the four PIN characters at a time via the user interface. However, displaying multiple characters can present security risks. For example, if a "hacker" or packet sniffing program somehow gains access to the communication between the PIN reveal application 155 and the user interface, the hacker could access half or more of the account holder's PIN leaving only one or two PIN characters to resolve. If the PIN comprises a common pattern, such as "1-2-3-4" and the characters 1 and 2 are revealed, the hacker could easily determine the remaining PIN characters.

Figure 3:
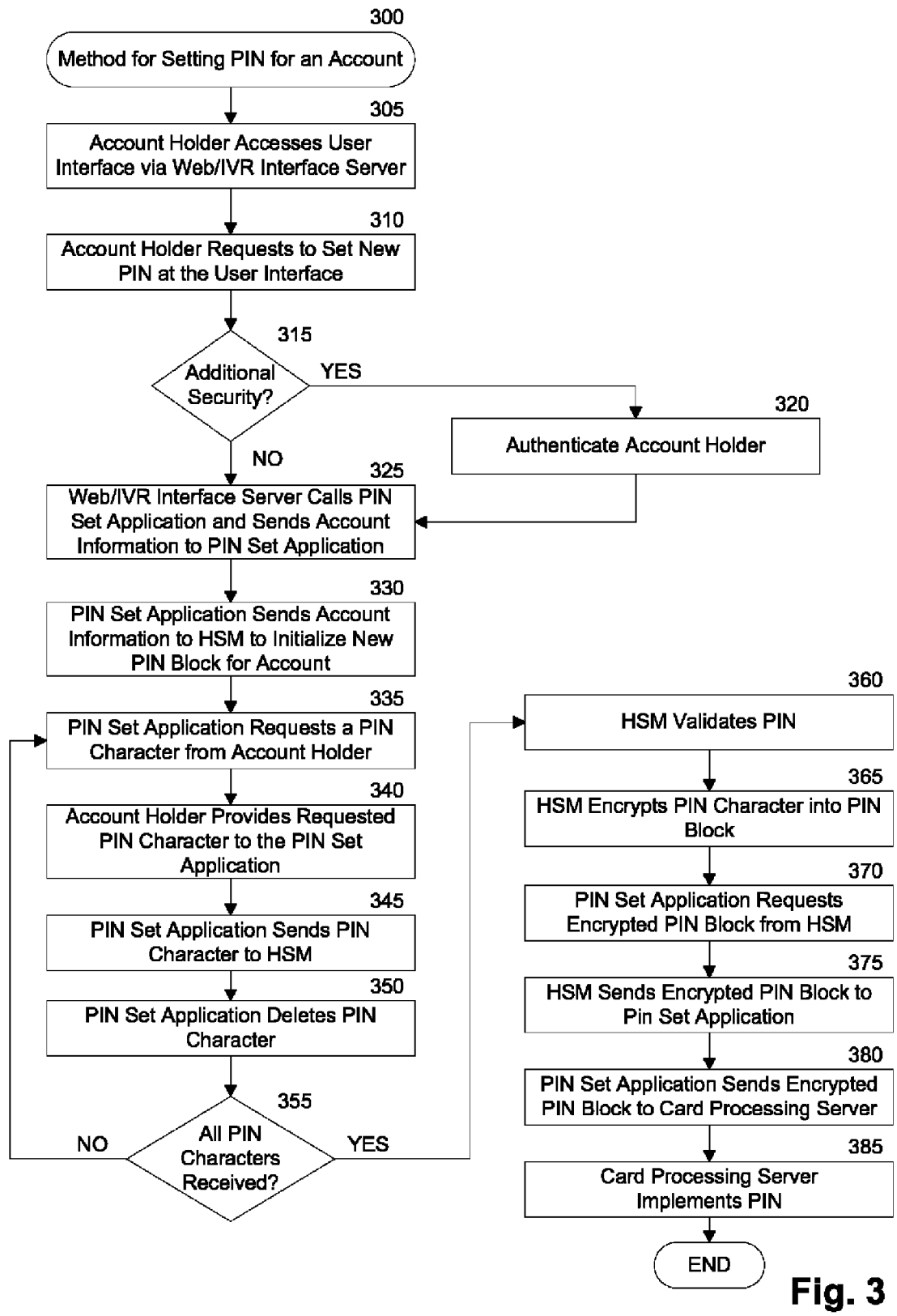
FIG. 3 is a process flow diagram depicting a method for setting a PIN for an account by the account holder in accordance with certain exemplary embodiments.

FIG. 3 is a process flow diagram depicting a method 300 for setting a PIN for an account by the account holder in accordance with certain exemplary embodiments. Referring to FIGS. 1 and 3, in step 305, the account holder accesses a user interface provided by a Web/IVR interface server 140. This step 305 can be substantially similar to that of step 205 discussed above with reference to FIG. 2.

In step 310, the account holder makes a request at the user interface to set or modify a PIN associated with an account, such as a financial account. In an Internet web site embodiment, the account holder may use a pointing device to click on a link or tab displayed on a web page associated with the account. For example, the account holder may use a mouse coupled to computer 110 to click the link or tab. In an IVR embodiment, the account holder may press a key pad on mobile phone 105 that corresponds with a "Set PIN" selection.

In step 315, the Web/IVR interface server 140 determines whether any additional security measures are required for the account holder to receive the PIN. This determination can be based on a status of the account holder or on the type of account that the PIN is associated with. Alternatively, all account holders and all account types may require additional security. If additional security is required, the method 300 proceeds to step 320. If no additional security is required, the method proceeds to step 325.

In step 320, the account holder is authenticated based on the additional security measures. The user interface may prompt the account holder for additional security information, such as a CVV number printed on a card associated with the account. The Web/IVR interface server 140 may then compare information received from the account holder to account information stored at the Web/IVR interface server 140 to authenticate the account holder. Alternatively, the Web/IVR interface server 140 may send the information to a card processing server 170 for authentication. Step 320 may be substantially similar to that of step 220 described in detail below with reference to FIG. 4.

In step 325, the Web/IVR interface server 140 makes a call to a PIN set application 157 at a PIN application server 150 and sends account information to the PIN set application 157. The account information can include any information that is included in a PIN block, such as an account number associated with the account. The account information may be stored at the Web/IVR interface server 140. Alternatively, the account information may be stored at a card processing server 170 and the Web/IVR interface server 140 may retrieve the account information from the card processing server 170 prior to sending the account information to the PIN set application 157.

In step 330, the PIN set application 157 sends the account information to an HSM 165 at an HSM server 160 along with a request to initialize a new PIN block for the account. The HSM 165 creates a new PIN block for the account and waits for PIN characters from the PIN set application 157.

In step 335, the PIN set application 157 calls the user interface of the Web/IVR interface server 140 to prompt the account holder for a PIN character. In an Internet embodiment, an Internet web site provided by the Web/IVR interface server 140 may provide a web page having a text entry box for entering a PIN character. In an IVR embodiment, an IVR application at the Web/IVR interface server 140 may prompt the account holder for a PIN character using a pre-recorded message.

In step 340, the account holder provides the PIN set application 157 with a PIN character via the user interface of the Web/IVR interface server 140. In the Internet embodiment of step 335, the account holder can enter a character into the text entry box using a keyboard coupled to the computer 110. In the IVR embodiment of step 335, the account holder can press a key on a mobile phone 105 keypad corresponding to the PIN character that the account holder selects.

In step 345, the PIN set application 157 receives the PIN character from the user interface and sends the received PIN character to the HSM 165. After sending the PIN character to the HSM 165, in step 350, the PIN set application 157 deletes the PIN character. In certain exemplary embodiments, the PIN set application 157 immediately deletes the PIN character after sending to the HSM.

In step 355, the PIN set application 157 determines if all PIN characters have been received by the HSM 165. If all PIN characters have been received, the method 300 proceeds to step 360. If there are additional PIN characters that are required from the account holder, the method returns to step 335 to request another PIN character.

In step 360, the HSM 165 validates the received PIN comprising the received PIN characters. That is, the HSM 165 determines if the PIN is a weak PIN or a strong PIN. This validation may be completed by comparing the received PIN to a list of PINs that are identified as "weak PINS." For example, the PIN "1-2-3-4" may be classified as "weak." The HSM 165 may then send a message to the PIN set application 157 to request that the account holder provide a new PIN. This validation step necessarily takes place before the PIN is encrypted. By having the HSM 165 perform this validation, the PIN is stored at a secure location, rather than on a server that could be vulnerable to security breaches.

In step 365, the HSM 165 encrypts the PIN characters into the PIN block created in step 330. That is, the encryption takes place on a secure platform. The HSM 165 may also encrypt the account information into the PIN block.

In step 370, the PIN set application 157 requests the encrypted PIN block from the HSM 165. In step 375, the HSM 165 sends the encrypted PIN block to the PIN set application 157. In step 380, the PIN set application 157 sends the encrypted PIN block the card processing server 170 and the card processing server 170 stores the encrypted PIN block in a PIN block repository 175. In step 385, the card processing server 170 implements the new PIN contained in the received PIN block. Thus, the card processing server 170 will reference the new PIN when processing transactions involving the account. After step 385, the method 300 ends. Of course, the Web/IVR interface server 140 may continue to interact with the account holder as necessary to complete the account holder's service.

Figure 4:
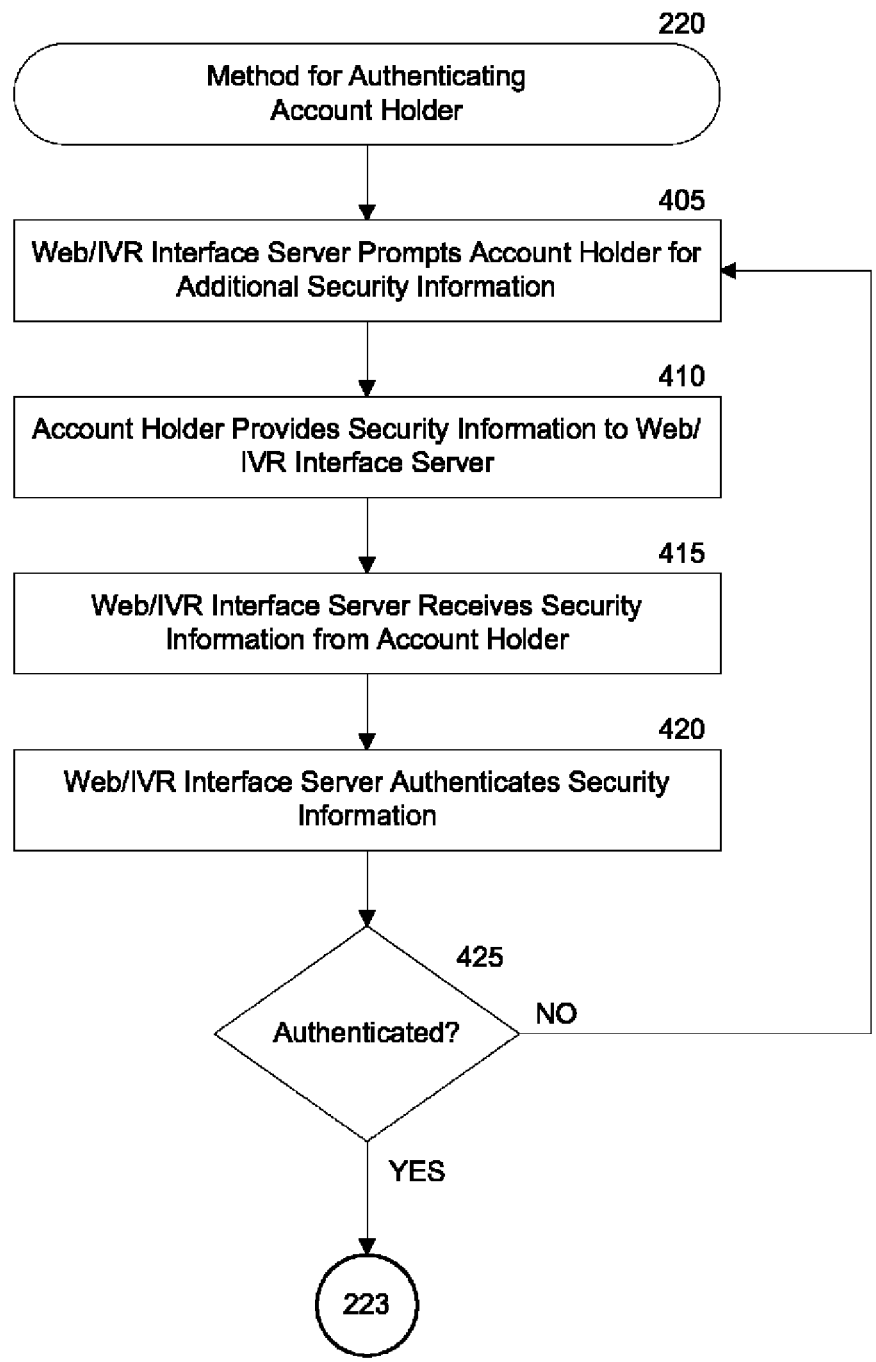
FIG. 4 is a process flow diagram depicting a method for authenticating an account holder in accordance with certain exemplary embodiments.

FIG. 4 is a process flow diagram depicting a method 220 for authenticating an account holder in accordance with certain exemplary embodiments. Referring to FIGS. 1 and 4, in step 405, a user interface of Web/IVR interface server 140 prompts an account holder for additional security information. This additional security information can include any information that can be used to authenticate the account holder, such as, for example, a CVV code on a card associated with the account, an expiration date of the card, the account holder's social security number, or the account holder's mother's maiden name.

In step 410, the account holder provides the user interface with the requested information and in step 415, the requested information is received at the Web/IVR interface server 140. In step 420, the Web/IVR interface server 140 authenticates the account holder using the received additional security information. In certain exemplary embodiments, the Web/IVR interface server 140 authenticates the account holder by comparing the received additional security information to account information stored at the Web/IVR interface server 140. In certain embodiments, the Web/IVR interface server 140 sends the received additional security information to a card processing server 170 or other computing system to authenticate the user. The card processing server 170 can send a message to the Web/IVR interface 170 indicating whether the account holder is authenticated.

In step 425, if the account holder is authenticated, the method 220 proceeds to step 223 of FIG. 2. If the account holder is not authenticated, the method 220 returns to step 405 to prompt the account holder to re-enter additional security information. In certain exemplary embodiments, the account holder may be limited to a certain number of attempts to be authenticated by the Web/IVR interface server 140. For example, after three unsuccessful attempts, the account that the account holder is attempting to access may be "frozen" until the account holder can verify their identity.

Figure 5:
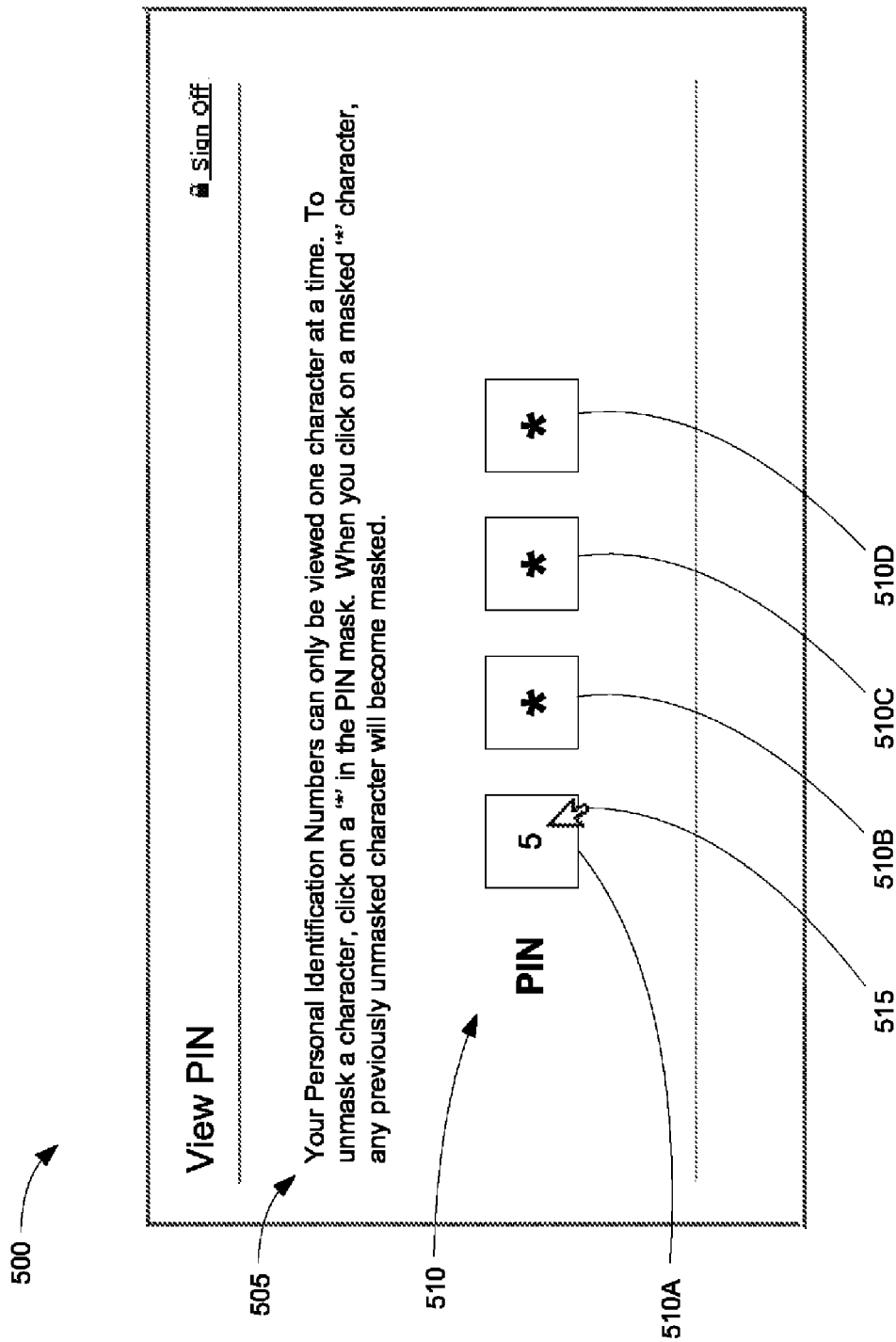
FIG. 5 depicts a screen image of a user interface in accordance with certain exemplary embodiments.

FIG. 5 depicts a screen image of a user interface 500 in accordance with certain exemplary embodiments. Referring to FIGS. 1 and 5, the user interface 500 may be embodied in a web browser executing on a user device, such as mobile phone 105, computer 110, kiosk 115, or any other device having a web browser. Alternatively, the exemplary user interface 500 may be embodied in another software application other than a web browser, such as a financial software program or dedicated PIN administrative software package.

The user interface 500 includes instructions 505 to direct an account holder as to how to access a PIN 510 associated with an account. Although in this exemplary embodiment, the PIN includes 4 PIN characters 510A-510D, one skilled in the art would appreciate that the user interface 500 could be configured to support PINs having any number of characters. In this screen image of the user interface 500, the account holder has placed a cursor 515 over the PIN character 510A and clicked a pointing device, such as a mouse coupled to computer 110, to reveal the PIN character 510A. The remaining PIN characters 510B-510D are masked using an asterisk. If the account holder deselects the PIN character 510A, the PIN character 510A would also become masked. The account holder could then select another PIN character, such as PIN character 510B, to reveal that PIN character.

One of ordinary skill in the art would appreciate that the present invention supports systems and methods for disclosing a secure personal identification number ("PIN") associated with a financial account to an account holder and for allowing the account holder to set or modify the PIN. The systems and methods may include a PIN reveal application that interacts with an HSM to decrypt and disclose the PIN to the account holder one or more PIN character(s) at a time. The systems and methods may also include a PIN set application that interacts with the HSM to encrypt PIN characters received by the PIN set application from the account holder. The HSM can include a combination of hardware and software that provides a secure platform to encrypt and decrypt a PIN. The HSM may also provide validation for a received PIN. The systems and methods may interact with the account holder using a web browser interface or an IVR interface.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A method for disclosing a personal identification number ("PIN") associated with an account, comprising:
   (a) receiving a request for a character of a PIN, the PIN comprising a plurality of PIN characters stored in an encrypted form;
   (b) requesting, by a PIN application executing on a computer, a decrypted form of one of the plurality of PIN characters corresponding to the requested character of the PIN from a hardware security module ("HSM");
   (c) receiving, at the PIN application, the decrypted form of the one of the plurality of PIN characters;
   (d) outputting the decrypted form of the one of the plurality of PIN characters;
   (e) deleting the one of the plurality of PIN characters from a memory of the PIN application; and
   (f) repeating steps (b) through (e), respectively, for each requested character of the PIN up to a number of characters fewer than a total number of the plurality of PIN characters.

2. The method of claim 1, further comprising the steps of:
   decrypting, by the HSM, an encrypted data block comprising the encrypted form of the PIN characters; and
   sending, by the HSM, the decrypted form of the one of the plurality of PIN characters to the PIN application.

3. The method of claim 1, further comprising the steps of:
   retrieving the encrypted form of the PIN at the PIN application from a transaction processing server that stores the PIN in the encrypted form; and
   sending, by the PIN application, the encrypted form of the PIN to the HSM.

4. The method of claim 1, wherein the request for a character of the PIN comprises a request for a character of the PIN other than the first character of the PIN.

5. The method of claim 1, wherein the one of the plurality of PIN characters is output to a user at an Internet web site.

6. A system for disclosing a personal identification number ("PIN") associated with a transaction account, comprising:
   a user interface for requesting a portion of the PIN in an unencrypted form, the PIN comprising a plurality of PIN characters stored in an encrypted data element;
   a PIN module logically coupled to the user interface and a hardware security module ("HSM") and operable, respectively for each character of the PIN up to a number of characters fewer than a total number of the plurality of PIN characters, to
      receive a request for a character of the PIN from the user interface,
      interact with the HSM to decrypt the character of the PIN, and
      provide the decrypted character of the PIN for presentation via the user interface.

7. The system of claim 6, wherein the request for a character of the PIN comprises a request for a character of the PIN other than the first character of the PIN.

8. The system of claim 6, wherein the user interface is operable to limit a total number of requests for characters of the PIN to a pre-defined number of PIN characters fewer than the total number of the plurality of PIN characters.

9. The system of claim 6, wherein the PIN module is further operable to delete the decrypted character from a memory of the PIN module after the decrypted character is output to the user interface.

10. The system of claim 6, further comprising a card processing server logically coupled to the PIN module and operable to store the encrypted data element and provide the encrypted data element to the PIN module upon receiving a request from the PIN module.

11. The system of claim 6, wherein the user interface comprises an Internet web browser interface.

12. The system of claim 6, wherein the user interface comprises an interactive voice response interface.

13. A method for setting a personal identification number ("PIN") of an account, comprising:
- receiving, at a PIN application, one character of a PIN entered at a user interface;
- sending, by the PIN application, the one character of the PIN to a secure platform;
- deleting, by the PIN application, the one character of the PIN sent to the secure platform from a memory of the PIN application;
- repeating the receiving, the sending, and the deleting respectively for each character of the PIN;
- storing the received characters of the PIN on the secure platform;
- encrypting the received characters of the PIN into an encrypted PIN data element comprising the PIN; and
- transmitting the encrypted PIN data element to a card processing system.

14. The method of claim 13, further comprising the step of validating a security strength of the PIN prior to the encrypting the received characters of the PIN into the encrypted PIN data element.

15. The method of claim 13, further comprising the step of implementing the PIN in the encrypted PIN data element for transactions associated with the account.

16. The method of claim 1, wherein the deleting the one of the plurality of PIN characters from a memory of the PIN application comprises overwriting the memory of the PIN application with random data.

17. The method of claim 13, wherein the deleting the one character of the PIN sent to the secure platform from a memory of the PIN application comprises overwriting the memory of the PIN application with random data.

18. The method of claim 1, further comprising the step of:
- displaying, at a user interface, a masked representation of each character of the plurality of PIN characters, wherein
- outputting the decrypted form of the one of the plurality of PIN characters comprises revealing, at the user interface, the decrypted character in place of one of the masked representations of the plurality of PIN characters.

19. The method of claim 18, wherein
- when repeating steps (b) through (e), only one decrypted character is revealed at a time in place of one of the masked representations of the plurality of PIN characters.

20. The method of claim 1, further comprising the steps of:
- before requesting a decrypted form of one of the plurality of PIN characters, prompting a user for security information; and
- receiving security information from the user and authenticating the user based on the security information.

21. A method for disclosing a personal identification number ("PIN") associated with an account, comprising:
- displaying, at a user interface, a masked representation of each character of a PIN comprising a plurality of PIN characters;
- receiving a request for a character of the PIN stored in an encrypted form;
- requesting, by a PIN application executing on a computer, a decrypted form of one of the plurality of PIN characters corresponding to the requested character of the PIN from a hardware security module ("HSM");
- receiving, at the PIN application, the decrypted form of the one of the plurality of PIN characters;
- outputting the decrypted form of the one of the plurality of PIN characters;
- deleting the one of the plurality of PIN characters from a memory of the PIN application; and
- repeating the requesting, receiving, outputting, and deleting, respectively, for each requested character of the PIN up to a number of characters fewer than a total number of the plurality of PIN characters, wherein
- outputting the decrypted form of the one of the plurality of PIN characters comprises revealing, at the user interface, the decrypted character in place of a corresponding one of the masked representations of the plurality of PIN characters.

* * * * *